United States Patent [19]

Weiss

[11] Patent Number: 4,719,426
[45] Date of Patent: Jan. 12, 1988

[54] METHOD FOR MAGNETICALLY DETECTING A LOCALIZED DISTURBANCE OF THE GROUND

[75] Inventor: Oscar Weiss, London, England

[73] Assignee: Scopemoor Limited, England

[21] Appl. No.: 572,149

[22] Filed: Jan. 19, 1984

[30] Foreign Application Priority Data

| Jan. 20, 1983 | [GB] | United Kingdom | 8301529 |
| Apr. 27, 1983 | [GB] | United Kingdom | 8311464 |
| May 31, 1983 | [GB] | United Kingdom | 8314804 |

[51] Int. Cl.⁴ ............ G01V 3/00; G01V 3/08
[52] U.S. Cl. ................................................ 324/345
[58] Field of Search ............................ 324/326–329, 324/345

[56] References Cited

U.S. PATENT DOCUMENTS

| 3,281,660 | 10/1966 | Studenick | 324/345 |
| 3,836,841 | 9/1974 | Morrison | 324/5 |
| 3,875,497 | 4/1975 | Madsen | 324/326 |
| 4,016,486 | 4/1977 | Pecori | 324/3 |
| 4,130,792 | 12/1978 | Sullivan | 324/3 |
| 4,300,097 | 11/1981 | Turner | 324/329 |
| 4,367,439 | 1/1983 | Fraser | 324/330 |
| 4,427,943 | 1/1964 | Cloutier et al. | 324/326 |

FOREIGN PATENT DOCUMENTS

| 0096380 | 12/1983 | European Pat. Off. |
| 1623110 | 4/1971 | Fed. Rep. of Germany |
| 528568 | 11/1940 | United Kingdom |
| 1280145 | 7/1972 | United Kingdom |
| 1294484 | 10/1972 | United Kingdom |
| 1446742 | 8/1976 | United Kingdom |
| 1509914 | 5/1978 | United Kingdom |
| 1509380 | 5/1978 | United Kingdom |
| 2078968 | 6/1980 | United Kingdom |
| 1577742 | 10/1980 | United Kingdom |
| 1585485 | 3/1981 | United Kingdom |
| 2006438 | 3/1982 | United Kingdom |
| 2032626 | 2/1983 | United Kingdom |
| 2057147 | 11/1983 | United Kingdom |

OTHER PUBLICATIONS

Soviet Inventions Illustrated, Derwent publications Ltd., Tech D31 225,425–781,207, issued 9/9/81, p. 7.

Primary Examiner—Reinhard J. Eisenzopf
Assistant Examiner—Welter E. Snow
Attorney, Agent, or Firm—Leydig, Voit & Mayer

[57] ABSTRACT

The invention is predicated upon the fact that a buried object causes a disturbance of the local value of the earths magnetic field due to both the disruption of the soil and the material of the object. The change in intensity of the field will usually be to small to detect reliably, but the horizontal and/or vertical gradients of the magnetic disturbance is detectable. A method of detecting a localized disturbance of the ground is disclosed in which a plurality of mutually spaced apart detector units are swept across an area of ground suspected of containing a localized disturbance and in which the detector units are responsive to the magnetic field gradient associated with the resulting disturbance of the load magnetic field. Non-metallic objects may be detected.

10 Claims, 9 Drawing Figures

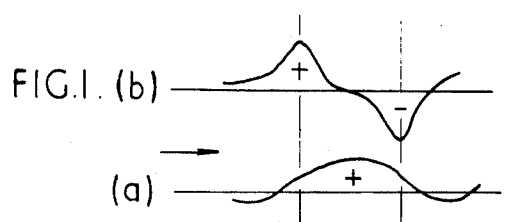
FIG.1. (b) / (a)
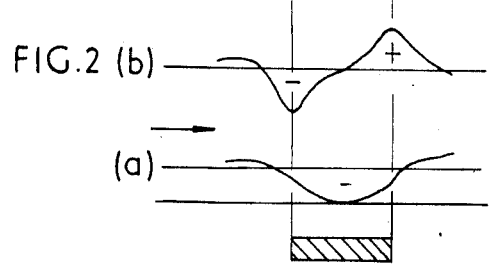
FIG.2 (b) / (a)
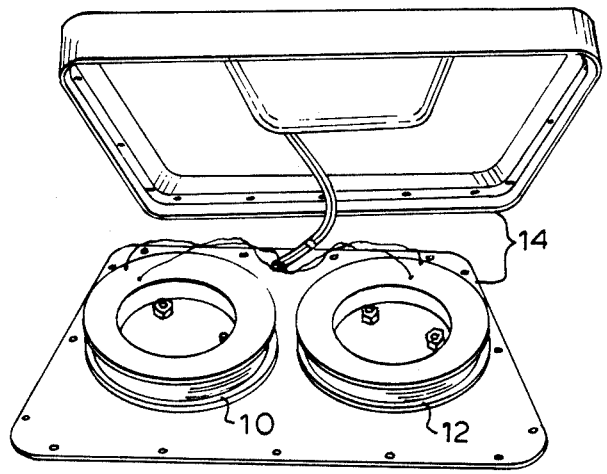
FIG. 4(a)
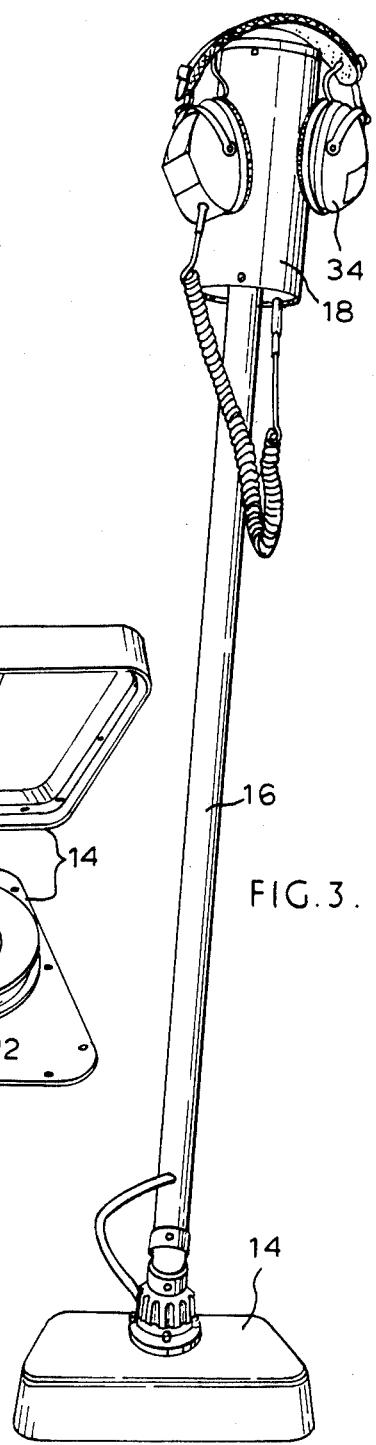
FIG. 3.

METHOD FOR MAGNETICALLY DETECTING A LOCALIZED DISTURBANCE OF THE GROUND

BACKGROUND OF THE INVENTION

1. Field of Invention

This invention relates to a method for detecting a localised disturbance in the ground. The invention finds particular application in the detection of plastic encased mines but can also be used for the detection of metal encased mines, the detection of water or gas pipes, electric cables or other buried objects.

2. Description of Prior Art

Metal detectors are well known but these can of course only be used for detecting the presence of magnetically susceptible metallic objects below the surface of the ground. The known devices cannot be used for detecting non-metallic objects such as plastic pipes or plastic encased mines buried below the surface of the ground.

SUMMARY OF THE INVENTION

According to a first aspect of the present invention there is provided a method of detecting the presence of a localized disturbance of the ground. The method comprises the steps of sweeping an area of the ground with a detector which is responsive to a magnetic radiant and which comprises a plurality of mutually spaced apart detector units, detecting a change in the output from the detector units through the change in magnetic radiant caused by the localized disturbance and not by any magnetic object, and producing a signal capable of direct human perception when such change is detected.

According to a second aspect of the present invention, there is provided a method for detecting a physical disturbance of the ground defined by a boundary between disturbed ground and undisturbed ground. The method comprises the steps of sweeping an area of the ground with a detector which is responsive to a magnetic radiant, generating a signal indicative of the magnetic radiant at the boundary between disturbed and undisturbed ground, and producing an output capable of direct human perception in response to the signal.

It is believed that the invention functions according to the following theory.

The soil contains various minerals amongst them are essentially common hematite, magnetite, maghemite (magnetic hematite), ibnenite. These and other magnetically susceptible materials have their origin in the decomposition of rocks and are spread by water and wind on the surface of the ground and penetrate into the soil by rain, water and cultivation of the ground. The later factor is important in inhabited areas. A further supply of these minerals is provided by convection currents in the lower atmosphere. Powerful convection currents carry particles from the surface of rocks and the ground into the atmosphere. These particles are spread and deposited on the soil surface by inversion currents. Amongst such particles iron and magnetite are most common. This fact is clearly demonstrated by the micro analysis of airborne particles and such analysis has been carried out by the inventor.

A detailed analysis of near surface magnetic material has been carried out in Australia by the Australian Government CSIRO, Palemagnetic Group. The investigation shows that even 0.2 percent of magnetic material in the soil is sufficient to produce as much as 22 percent increase in electrical conductivity. (G. Buselli. The effect of near-surface supermagnetic material are electromagnetic measurements, Geophysics V.47, No. 9, 1982, p. 1315–24.)

In undisturbed ground the minerals accumulate in the top soil over the years and a thin magnetic layer tends to be built up by magnetic polarisation linkage. Consequently, the magnetic lines of force tend to be uniform in a local area of consistent composition. Once the soil is disturbed the magnetic layer is broken and the links distroyed so that the earths magnetic field becomes locally distorted and non-uniform at the disturbance. It would appear that the lack of uniformity in the magnetic field due to the disturbance persists for at least several months and possibly for substantially longer. This effect persists even if a hole dug in the ground is refilled with the soil taken from the hole because the magnetic polarisation of the susceptible elements has been disturbed. If an object is buried in the hole then there will probably be a permanent disturbance of the local magnetic field.

An average value of the intensity of the earths mangetic field is 0.5 Oersted which can be expressed as $0.5 \times 10^5$ gamma. The magnetic intensity at ground level would be reduced by the digging of a hole, say 10 centimeters in diameter, by a value in the range of 1 to 5 gamma. If the magnetic anomaloy caused by the hole is to be detected by variation of the ground level magnetic intensity then it can be seen that the sensitivity of detection would have to be in the range of one part in ten thousand to one part in fifty thousand. It would be difficult to construct a detector with a reliable sensitivity of this order. However, it is a known scientific fact that the gradient of a field of force can be measured with much higher sensitivity than the force itself. The present invention is therefore designed to take advantage of this fact. The invention utilises the magnetic gradient, that is the differential of magnetic field strength with respect to distance.

An important practical problem in the detection of objects below the surface of the ground is that in general one is only interested in a specific form of object, for example a mine. If use of the detector is to be practical it is necessary to envoke some means of discriminating between detected objects. The inventor has recognised two aspects of magnetic characteristics associated with an object buried below the ground.

Firstly, the horizontal gradient of the magnetic field identifies the edge of the hole in which the object is buried whereas the peak of the change in intensity tends to identify only the centre of the disturbance. This means that the shape and size of the buried object can be determined and this will give some indication as to whether or not the buried object is likely to be of interest.

The second aspect of the magnetic characteristic is that a buried magnetically susceptible metallic object will increase the strength of the local magnetic field whereas a buried non-magnetically susceptible object will decrease the strength of the local field. The sign of the horizontal magnetic gradient encountered when traversing an area of ground containing a buried object will therefore give an indication as to whether the buried object is magnetically susceptible or not. Considering a magnetic metallic object, traversing across the area containing the object one will first encounter a positive magnetic gradient and will subsequent encounter a negative horizontal magnetic gradient when passing over the buried object. The signs of the gradients are reversed when one traverses across a buried non-magnetically susceptible object.

The present invention provides a method responsive to magnetic gradients resulting from a buried object and it is believed that the above described theory illustrates the particular function and advantages of this method.

BRIEF DESCRIPTION OF DRAWINGS

Embodiments of the present invention will now be further described by way of example only and with reference to the accompanying drawings, in which:

FIG. 1 represents the magnetic characteristics associated with a buried magnetically susceptible object, FIG. 2 illustrates the magnetic characteristics associated with a buried non-magnetically susceptible object, FIG. 3 is a perspective view of an embodiment of the apparatus of the present invention, FIGS. 4(a), 4(b) and 4(c) illustrate detector units for the embodiment of FIG. 3, FIGS. 5(a) and 5(b) are a circuit diagrams in block form of circuits for processing output from the detector units.

DESCRIPTION OF THE PREFERRED EMBODIMENTS

Figure 4B:
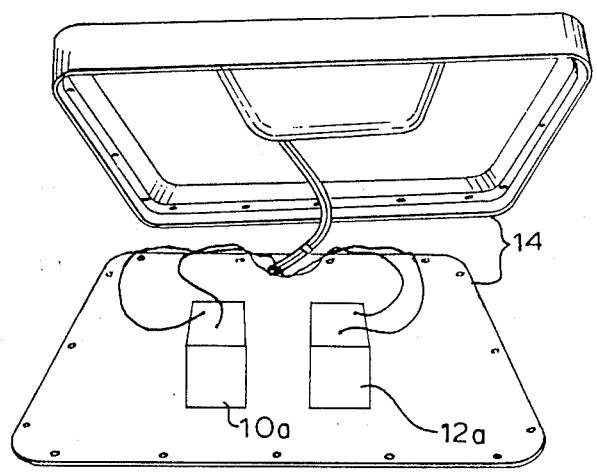

FIGS. 1 and 2 illustrate the physical characteristics enabling operating of the present invention. In each case the line drawing indicates a hole which has been dug in the ground with an object placed at the bottom of the hole and the hole subsequently refilled with the displaced material. In FIG. 1 the buried object is formed of a magnetically susceptible material and in FIG. 2 the buried object is formed of a non-magnetically susceptible material. Line drawing (a) of each figure illustrates the change in the intensity of the local magnetic field at ground level resulting from formation of the hole and the burying of the respective object. Line drawing (b) of each figure represents the change in magnetic field horizontal gradient resulting from formation of the hole and burying of the respective object, as encountered when traversing the area of the buried object in the direction indicated by the arrows. It is evident from FIGS. 1 and 2, line drawings (b), that the horizontal magnetic field gradient not only indicates relatively precisely the boundaries of the hole and buried object but also provides an indication of the magnetic susceptibility of the material from which the buried object is formed or is partially formed.

In a simple form, the detector of the present invention comprises two coils spaced apart in a common plane and electrically connected in series opposition to a detector circuit. Movement of the detector in a horizontal plane just above the surface of the ground will cause the coils to cut lines of the earths magnetic field which at most places on the surface of the earth are inclined to the horizontal. The apparatus is arranged such that where the ground is undisturbed and the magnetic field is uniform, the detector circuit produces no output. At the point in the scanning movement when one coil is moving over undisturbed ground and the other coil enters an area of magnetic disturbance, the output from the coils is unbalanced and this can produce a signal in the output circuit such that the boundary of the disturbance is indicated.

By charting points of discontinuity in repeated scans of the ground in different directions, an outline plan of a hole in the ground can be made whether or not the hole contains an article without measurable magnetic susceptibility or a magnetically susceptible article.

One of the problems met when measuring small changes and distortion in any field of physics, is the distortion caused by the observer and/or the instruments used.

For this reason and for the sake of simplicity, the detector instrument is free from any material or component that possesses any but the very minimum magnetic susceptibility. For this reason, although fluxgates could be used in certain conditions, the preference is for induction coils wound on entirely nonmagnetic cores, such as plastics or suitable wood, etc.

The detector consists of two co-planar and identical coils wound on identical cores of nonmagnetic material. The coils are made up of 5000–10,000 turns of thin insulated copper wire. The diameter of the coils varies according to the size of the objects buried in the soil, the detection of which is the objective of any given case. A further factor is the efficiency required in covering large areas.

The two coils are wound and tested so as to give identical output when moving in homogenous magnetic fields. The coils are connected in opposition, and fixed to the same portable frame or platform, any irregularity in the coil windings which may cause differences in their induced e.m.f. is balanced out electrically.

The sensitivity of this simple instrument is surprisingly high. A small hole of 5–6 cm in diameter, causing 1 to 5 gamma reduction in the intensity of the earth's field, is detected by giving $10^{-7}$–$10^{-6}$ volt output. By amplification of the order of $10^6$ to $10^7$ and by filtering out frequencies of 40 cycles and higher, it is easily possible to make the output, which is a sharp pulse, audible in headphones by well known suitable electronic circuit.

The outcome of the above process is that sharp, short signals are heard in the headphones whenever any one of the edges of the coils passes over any one of the edges of a hole of a buried object.

The geometry of the coil shape and its size is chosen according to the size of the target of detection. Similarly the distance between the centres of the coils chosen according to the size and order of the depth of the burial of the target objects in the soil. For these reasons coils of different sizes and shapes are interchangeable by simply plugging them into the amplifier and filter circuit. The angle of the container box of the coils at the end of the handle can be changed to approach the position at right angles to the inclination of the earth magnetic field. Similarly, the container of the coils and thereby the two coils can be rotated at the end of the handle and fitted in a desired orientation relative to the magnetic declination of the earth magnetic. This is necessary when the horizontal magnetic gradient is to be detected in different directions from the same position of the operator, in order to locate the edges of the hole in the soil, or of the object buried in the soil and thereby give the size and shape of the target.

It is possible to provide a d.c. biasing signal in the electric circuit so that the signal from the detector units can be superimposed on the bias signal. The resulting output signal will then be in the form of an increase or decrease with respect to the bias signal in accordance with the nature of the buried object, as explained above with reference to FIGS. 1 and 2.

For the above described operation it is undesirable to feed an alternating current into the coils as in a conventionally metal detector because such currents establish corresponding magentic fields which would interfer with the disturbance of the earth's magnetic field caused by the buried object. At best this would render the detector unreliable. However, it is quite feasible to construct the detector to allow for the establishment of alternating currents in the coils so that the detector may additionally be switched to a mode of operation in which it functions as a conventional metal detector.

If a rock has been in the surface of the ground for a long time it is likely to contain magnetically susceptible components. Nevertheless the discontinuity between the soil and the rock may well be detected by the apparatus of this invention and by studying the output from the detector it may be possible to deduce that the article is neither metallic nor plastic but it is in fact a rock which has been in position for some time.

Figure 5A:
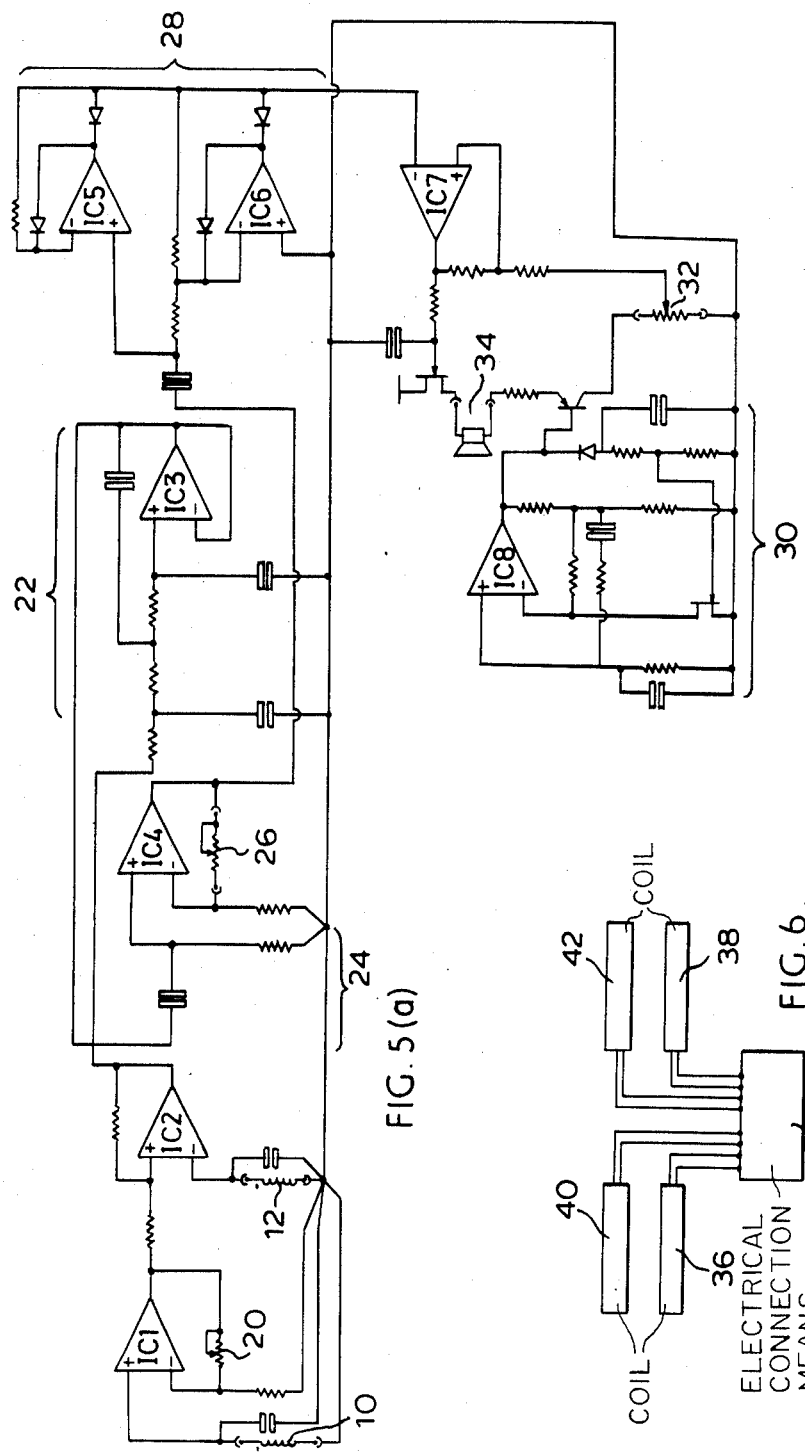

A preferred form of the apparatus of the invention is illustrated by FIGS. 3, 4(a) and 5(a) of the drawings. The detector comprises two detector units in the form of coils 10, 12 the diameters of which are preferablely small in relation to the size of the object to be detected. The coils 10, 12 are mounted in a head 14 such that the distance between the coils is variable. This distance may be varied for use in successive test over the same area of ground or for use when searching for objects of different size.

The head 14 is mounted on a handle 16 at a variable angle to suit the convenience of the user so that in use the coils 10, 12 will be in a horizontal plane a little above the surface of the earth. The coils 10, 12 may be spaced apart transversely to the vertical plane containing the handle 16 in use, or may have their centres spaced apart in that plane so that with the user carrying the handle 16 in front of him, a scan will be effected merely by the user walking forwards. The angle of the line joining the centres of the coils 10, 12 to the vertical plane containing the handle can be variable to suit the particular application.

The upper end of the handle 16 carries a module 18 containing the detector circuit and a power supply. By mounting the electric circuit and power supply at the upper end of the handle the disturbance of the magnetic characteristics to be detected is minimized.

As clearly seen in FIG. 4(a) the head 14 embodies a pair of horizontally disposed, horizontally separated inductive coils 10, 12 each, in the example being described, having five thousand turns, an internal diameter of 60 mm and an external diameter of 80 mm. In an intermediate setting the centres of the coils 10, 12 are spaced apart by 157 mm but an adjustable mounting (not shown) is included to enable the space in between the coil centres to be readily adjusted. The coils 10, 12 are mounted in a protective casing.

Though the coils 10, 12 described have an external diameter of 80 mm there will be applications where coils of other diameters might be preferred. For example, the coils might have an external diameter in the range of 20 mm to 300 mm. There may then be sets of coils available for the detector with the head 14 suitably adapted such that different pairs of coils can be used for particular applications.

FIG. 5(a) is a circuit diagram in block form of the circuit contained in the module 18 at the upper end of the handle 16 of the detector. The coils 10, 12 are connected to respective operational amplifiers I.C.1 and I.C.2. The operational amplifiers act as high impedance buffers for the respective coils 10, 12. Operational amplifier I.C.1 has a feed back circuit including a variable potentiometer 20 which can be used to adjust the relative outputs from the coils 10, 12. It should be appreciated that it is preferable for the coils to be as nearly identical as is practical. The operational amplifiers I.C.1 and I.C.2 may each be implemented by a respective half of a standard O.P. 227 integrated circuit component. The output from operational amplifier I.C.1 is feed into operational amplifier I.C.2. The output of I.C.2 is applied to a filtering section of the circuit consisting of a first filter 22 designed to reject frequencies of above approximately 40 hertz and a second filter 24 designed to reject frequencies of less than 1 hertz. The first filter 22 is implemented as a conventional Sallen-Key low pass filter comprising operational amplifier I.C.3. and the second filter 24 is a simple R.C circuit. Operational amplifier I.C.3 may be implemented as one half of a conventional O.P. 227 integrated circuit component. Output from the filtering section is applied to a high gain operational amplifier I.C.4. This operational amplifier may be formed of the other half of the O.P. 227 component used in the Sallen-key filter. Operational amplifier I.C.4 has a variable potentiometer 26 in a feed back circuit and this potentiometer 26 is used to adjust the sensitivity the detector circuit. Output from operational amplifier I.C. 4 is applied to a full wave rectifying circuit 28 implemented in two parts each having a respective integrated circuit component I.C.5, I.C.6 for which a conventional C.A. 31305 unit may be used in each case. Output from the full wave rectifying circuit 28 is applied to a comparator which employs integrated circuit I.C.7. I.C.7 may also be in the form of the conventional C.A. 31305 component. In the comparator output from the full wave rectifying circuit 28 is compared with a signal from a tone generating circuit 30 which is of conventional construction. Output from the tone generating circuit 30 is applied to the comparator via an adjustable potentiometer 32 and adjustment of this potentiometer 32 enables a threshold level to be set for output from the detector circuit. Output from the comparator is applied to a pair of headphones 34 which are to be worn as the operator of the detector. It will be appreciated that the arrangement of the tone generating circuit 30 and the comparator is such that an audible signal is produced in the headphones 34 when the output from the full wave rectifying circuit 28 exceeds the signal level set by the threshold potentiometer 32.

Use of the detector will now be described.

The operator swings the detector head 14 containing the induction coils 10, 12 at the end of a 150 cm long handle 16. As the coils 10, 12 cross a hole, whether it is open or filled with soil, the operator hears a number of sharp signals. Similar signals occur over the edges of buried objects whenever the magnetic susceptibility is lower or higher than that of the soil. As it was stated earlier the number of the signals vary according to the size of the coils and the distance between the coils, and the size of the hole or of the buried object.

Normally, where the size of the target is known, the coils are selected and located at such distance from each other that whenever an edge of the coil passes over the edge of a hole or of a buried object, a sharp signal is heard in the headphones.

For example: when the leading edge of the leading coil in the direction of the sweep of the detector passes over the first edge of the hole, or of a buried object, the first sharp pulse is produced by the peak in the horizontal magnetic gradient and one sharp signal is heard in the headphones.

When in the course of the sweep the same leading edge of the coil passes over the second edge of the hole, etc., a second signal is heard.

When the trailing edge of the leading coil passes over the first edge of the target, a third pulse causes a third signal to be heard. When the trailing edge of the leading coil passes over the second edge of the target, a fourth pulse causes a sharp signal in the headphones.

Thus we have four pulses causing four signals from the passing of the front coil over the two edges of a buried target or hole.

The second coil will cause, in a similar manner, four other signals as it passes over the target.

This is the ideal condition, but some of the above eight signals may overlap, as already mentioned, depending on the size of the coils and distance between the coils as well as on the size of target.

The gist of the results is that a series of pulses and consequent signals are produced by the instrument when swept over ground disturbed by holes and/or by buried objects.

Hearing such signals the operator repeats his sweep with the detector. He now marks the point of the first signal on the ground. This can be done by spraying a paint or using another marker on the ground.

Having done this, he repeats the sweep crossing the ground mark, and he again marks the ground at the point where the ultimate signal occurs.

The operator now repeats the sweep in the opposite direction, and marks the ground where the first signal occurs in this direction of the sweep. This point coincides with that of the last signal of the first sweep. He then continues the sweep and markes the ground where the last signal occurs. The point coincides with the first signal of the first sweep. The distance between the two signals marks the distance between two edges of the target and gives the width of the buried hole or object in the ground.

By changing the direction of the sweep of the detector the width of the target can be determined in different directions, hence the shape of the hole or object can be determined.

The above procedure is of great importance as no detector other than the present invention is known to give the size and shape of holes and buried objects.

Conventionally, the metal detectors used for the detection of buried metallic mines cannot differentiate between mines and so-called "tramp metals", i.e. metal debris which is especially abundant in war conditions. Consequently a large number of false alarms are produced, each of which has to be investigated and identified, causing delays, thereby holding up important operations.

Dealing now with the special problem of plastic mines the present invention has unique advantages. The metal detectors in use cannot detect plastic mines.

As has been earlier explained, peaks in the values of the horizontal gradient of the earth magnetic field delineate holes in the soil, whether or not such holes are re-filled by the disturbed soil. By burying a plastic mine in such a hole, the magnetic susceptibility is reduced by two factors. Firstly, the broken up soil, with which a hole would be re-filled has lost its magnetic susceptibility even long after the burial of the mine. Secondly, the plastic mine itself occupying a part of the hole has a minimal value of magnetic susceptibility. The result is a reduction of a horizontal gradient in the earths magnetic field. The size of the mine is known, and the size of the hole can be determined by the present invention as has already been described.

But further important information is also obtainable by the detector of this invention:

The sweeping of the detector over a hole containing a plastic mine will produce characteristic signals. As the sweep of the detector passes from undisturbed ground across the hole containing the plastic mine, it passes from the normal horizontal gradient to a negative gradient caused by the hole and then from the negative gradient to a positive gradient as the detector passes from the hole to undisturbed ground of higher magnetic susceptibility. The horizontal gradient will therefore be represented by a curve which passes from normal values to a sharp negative peak and from the negative to a sharp positive peak.

It is possible to superimpose the amplified e.m.f. over a steady frequency of sound in the headphones so as to cause a decrease followed by an increase.

A buried object of higher magnetic intensity than that of the soil will show the reverse of the above curve as the detector passes from the soil of normal magnetic susceptibility to that of higher susceptibility and then to lower, normal, magnetic susceptibility.

Thus, the detector not only gives the size of buried objects but can also detect whether the curves of the horizontal gradient of the earth magnetic field are caused by objects having a size and magnetic susceptibility which coincide with known characteristics.

The known charactheristics can be determined by burying samples of plastic mines in the area where the detection of such mines is required.

It is also possible to make the two induction coils of superconducting metals or alloys. Such coils would have zero electrical resistance and are especially efficient in conducting direct current without measurable losses, such as occur when such coils are charged with alternating current. Such coils would have a few turns of cadmium or suitable metal alloys, refrigerated by liquid helium and enclosed in small portable cryostats. The latter could be recharged from storage cryostats containing reserve helium.

The sensitivity of such coils would be many times higher than the normal thin copper wire wound induction coils. The increase in weight due to the cryostat would only justify the use of superconductor coils in special applications.

Submarine detection is one of such special problems, the detection of land and sea mines is another possible application. Another application would be the detection of hidden tanks and missile bases with the detectors being carried by aircraft.

Although the circuit illustrated in FIG. 5 and described above generates an audible output, it is also possible to implement the final output in a variety of alternative forms. For example the output may be indicated by a meter and it may alternatively be possible to mount a recording chart on the handle with an indicating pen which moves over the chart as the head scans. This would give a visual indication of the scans in plan view which can be related to the positions of the blips in the output signal.

Other possibilities will be apparent to those skilled in the art and it should be noted that the detector can be implemented in a simple and mechanically robust manner.

Although there has been described a detector comprising a pair of preferably identical coils, which may be circular or may be of some other shape, it is also possible, as shown in FIG. 4b use a pair of flux gates 10a, 10b, that is to say a pair of devices, each including a ferromagnetic core having a characteristic axis and carrying an output winding. The cores would be positioned side by side horizontally in a direction transverse to the characteristics core directions with the coils connected in series opposition. The use of flux gates will probably incur disadvantages due to their cost and the fact that the magnetic characteristic of their cores may disturb the magnetic characteristics which it is desired to detect.

The shape and size of a buried object may be determined by measuring the distance between the opposing pulses corresponding to the magnetic gradients indicated by line drawings (b) in FIGS. 1 and 2. One method of achieving this result is to support the detector handle on a tripod. The handle may be graduated in centimeters and the angle between the two pulses one at each edge of the buried object, can be read on a scale of degrees attached to the fixed tripod. Knowing the distance from the fixed pivot of the tripod to the coils, the width of the buried object can be determined by simple trigonometry. A simple computer, or even a table can be used. The recording of the width of the buried object can be achieved by fixing a pad to a fixed support carrying the fulcrum. On this pad is fixed a sheet of recording material. Fixed to the handle of the detector is a stylus or other recording device which marks the material on the fixed pad. The stylus moves with the movement of the handle, that is with movement of the detector coils. The pulses of the detector at the edges of the buried object can be transmitted by the detector circuit so as to mark the material of the sheet on the pad, thus indicating the width of the buried object. It may be possible to mount the head on the handle through a spring arrangement causing the head to be automatically oscillated transversely and repeatedly at an approximately predetermined rate. If the rate of the scanning is known, information concerning the discontinuity can be derived from the amplitude of the blips.

By including a flat spring joint in the handle of the detector, the spring preferably being of a non-metallic material, it is possible to oscillate the detector coils rapidly so as to increase the sensitivity of the detector even if the operator swings the coils relatively slowly.

For large scale applications, the coils could be fixed to a suitable non-metallic frame and embodied in a streamline housing and may thus be used for the detection of submarines, and ship wrecks including old wooden ships.

By towing coils of suitable size in a pod from a helicopter or aeroplane, it is possible to detect the boundaries of a mine field, the presence of hidden armed units, munition stores, undergrond tunnels systems, underground pipelines and the like.

It has been found that rotating earth magnetic gradiometers are unsuitable for field work, owing to the rotating electrical contacts in which by wear and dirt variable contact resistances develop, causing voltage variations of the same order as the e.m.f. induced by the gradient of the earths magnetic field. The present invention avoids this problem.

An object of the present embodiment is to provide means reducing the likelihood of obtaining a false indication that the detector has encountered a mine or other body requiring detection.

According to the present embodiment, a preliminary test is performed on a sample object which is later to be detected, so that the characteristic output signal derived from a scan with the detector over the sample object can be recorded, coded and stored in the memory of a computer for subsequent use as a reference when searching for objects in a certain area.

The sample object, for example a plastic mine, is likely to have metallic or metal components which will give characteristic output signals, in addition to the signals at the edges of the cavity where the object is buried, as described. The signals picked up from components of the mine all form part of the characteristic of that mine produced by scanning it with the detector.

Figure 5B:
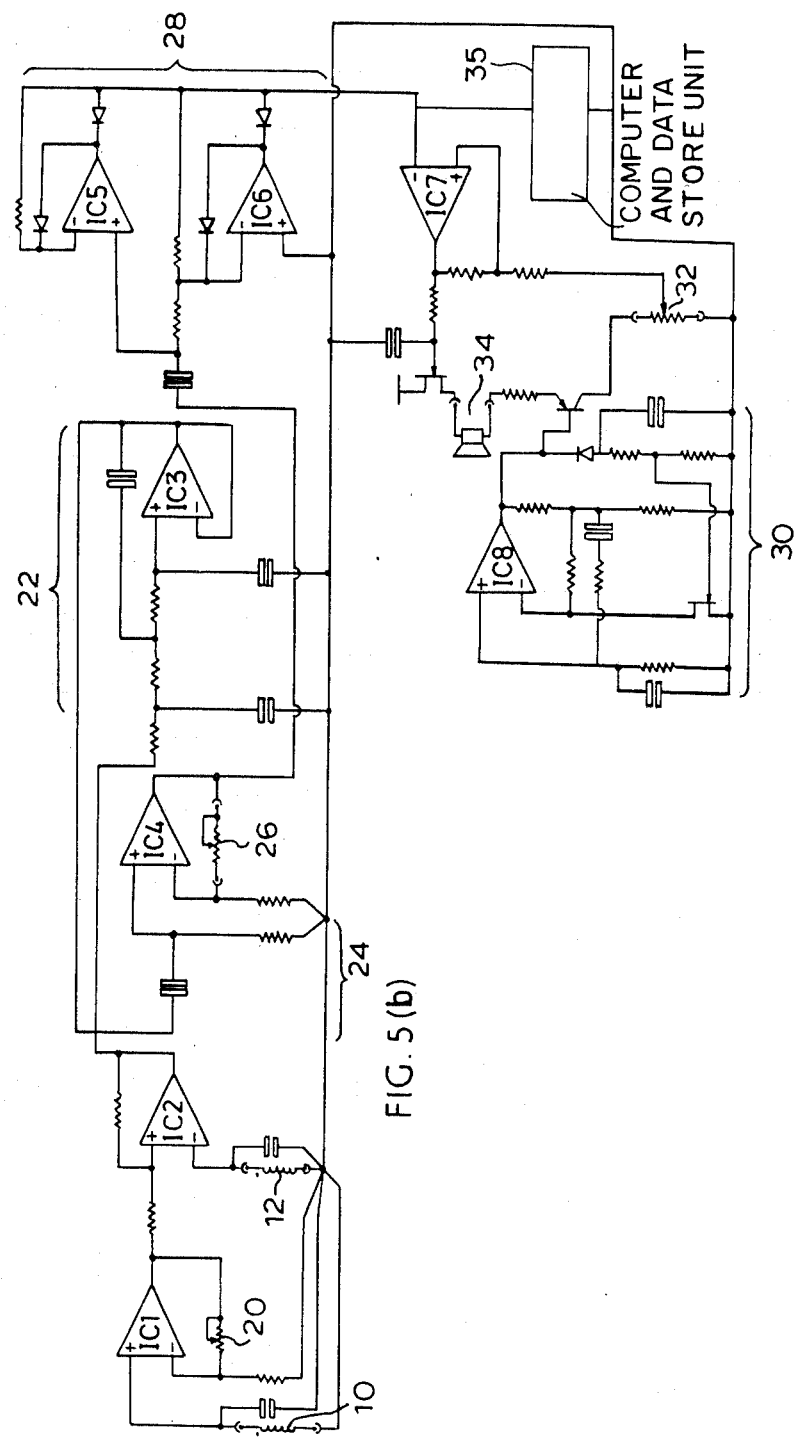

As shown in FIG. 5(b) detector for use in the field can then embody a computer 35 which will have stored in its memory, a coded version of the characteristic signal of the mine which is being searched for. The computer can also be programmed so that as the detector is used in the field, any signal received representing a magnetic discontinuity can be compared with the pre-recorded characteristic signal in the memory and if there is little similarity, then no output signal will be given.

Figure 4C:
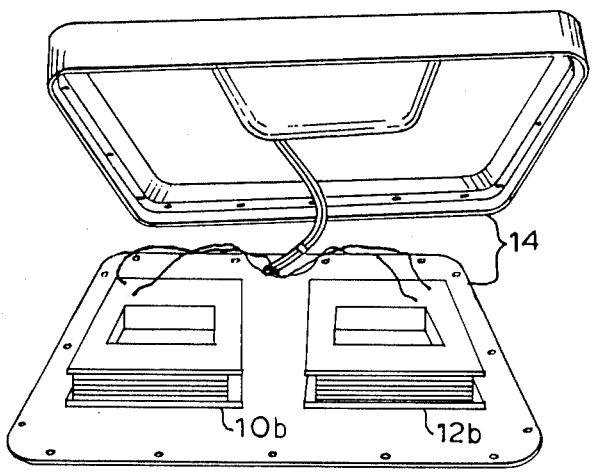

In the present embodiment, the detector coils are square in plan view, as shown in FIG. 4(c). The squares have sides 10 cms long. The distance between the centres of the two coils is 20 cms, so that the total width of the two detector coils and the spacing between them is 30 cms.

A typical scanning sweep might be 200 cms in amplitude and might take 2 seconds i.e. 1 cm per 0.01 second.

If a buried mine was 10 cms wide, then the length of scan between the first encounter of the first edge of the mine by the leading edge of the first coil and the last encounter with the second edge of the mine by the trailing edge of the second coil, will be 20 cms, and at the rate described above, that would be scanned in 0.3 seconds.

The spacing between, say, a signal where the trailing edge of one coil encountered the first edge of the first, and the leading edge of the other coil encountered that same edge of the mine would be 10 cms and that would be scanned in 0.1 seconds, a time which is too short to be easily recognised by the ear.

Accordingly, the detector is arranged to have a clock driven from a crystal oscillator, or possibly even controlled by the scanning movement of the detector, so as to generate time marking pulses at regular intervals of say, 0.001 seconds, so that in the full 2 second sweep there would be 2,000 time marker pulses. The detected signals can be superimposed on series of time marker pulses, so that the spacing between different components of a detected signal can be easily determined and fed to the computer.

That is just one example of a time base that can be used, but it will be clear that in a test on a sample mine, sweeping at a controlled rate over a controlled length of scan, a characteristic signal for that mine can be generated, and recorded, and that will show where the various peaks occur in relation to the time steps in the complete scan. The amplitudes of the characteristic signal at each time marker could be coded digitally and recorded in a computer memory.

If, as is likely, the sample mine includes a magnetic or even a metal component, or possible more than one, each of those will also produce a series of four peaks in the output signal, and they will form further components of the characteristic signal to be recorded.

The computer in a detector to be used when searching for similar mines in a particular area will have stored in its memory, the characteristic signal of the mine that is being searched for. During the actual search, the output signal can be continuously compared with the characteristic signal stored in the memory, so that if a similar signal appears in the output, it can be assumed that a mine has been found, and a warning signal can be given.

By use of the computer and its memory, the likelihood of getting false indications that a mine is present, merely from a magnetic discontinuity in the ground, is greatly reduced.

The computer need be only a small component of the detector, and in addition to the memory for storing the characteristic signal, the computer can contain a program which controls the comparison of the continuously received output signal with the memory signal. The computer may also allow for measurement of the speed of scan in the field, and may also allow for compensation for any variation between that speed of scan and the speed at which the characteristic signal was obtained in the initial test.

A further embodiment of the invention will now be described.

The above described arrangements function by detecting magnetic gradients in a particular plane, for example the horizontal plane. The present embodiment seeks to improve the sensitivity of a detector by providing magnetic gradients in two planes which are other than parallel to one another. In particular, the gradients may be horizontal and vertical.

According to the present embodiment, a detector comprises a first pair of inductive coils spaced apart in a first common plane, and a second pair of inductive coils spaced apart in a second common plane, parallel to the first plane, and electrical connection means at least for connecting two of the coils in opposition to an output circuit. The coils being arranged such that a notional line drawn from the centre of a first one of the first pair of coils to the centre of a first one of the second pair is parallel to a notional line drawn from the centre of a second one of the first pair of coils to the centre of a second one of the second pair of coils.

Preferably the connection means also connects the other two of the coils in opposition to an output circuit.

The electrical connection means may be arranged to be suitable for connecting the first pair of coils in opposition to an output circuit. Alternatively or in addition the electrical connection means may be arranged to be suitable for connecting the first coils of the pairs in opposition to an output circuit and the second coils of the pairs in opposition to an output circuit. In a further possible arrangement, the electrical connection means connect the first coil of the first pair and the second coil of the second pair in opposition to an output circuit and also connect the second coil of the first pair and the first coil of the second pair in opposition to an output circuit.

It will be understood that the centre of each coil lies at a respective apex of a notional parallelogram.

Preferably, the first coils of the pairs will share a common axis and the second coils of the pairs will share a further common axis. It is preferred that the two common planes be horizontal or inclined to the horizontal, and that the two common axes be at right angles to the common planes.

The outputs of the coils in each of the two common planes can be balanced so that no signals are generated when the detector is moved in a homogeneous magnetic field. The outputs of the first coils of each of the pairs, and the second coils of each of the pairs may also be balanced, so as to generate no signal if the vertical gradient of a magnetic field remains constant.

The electrical connection means may include appropriate switching means to make it readily possible to change the connections between the coils. It will be appreciated that by connecting in opposition, the pairs of coils in the first common plane or the second common plane only yields the same arrangement as is disclosed above.

Alternatively, the first coils of each pair or the second coils of each pair may be connected in opposition to an output circuit. Thus, the embodiment also provides a detector comprising two coils, each coil lying in a different respective plane and the coils being electrically connected in opposition to an output circuit.

The coils may for example lie each in a respective parallel plane and one may lie vertically above the other. In a particularly preferred embodiment, the coils may share a common axis.

This arrangement may be used for detecting magnetic gradients which may be, for example, vertical.

If, in addition to the outputs of the coils in each common plane are balanced, the outputs of the first coil of each pair are balanced, and the outputs of the second coil of each pair are balanced, it becomes possible to detect both horizontal and vertical magnetic gradients and therefore to impart a greater sensitivity to the detector than would be the case if only a single pair of coils in a common plane are provided.

The gradient of a magnetic field is the second derivative, with respect to position, of the magnetic potential. Such derivatives satisfy the Laplace's equation:

$$\frac{d^2w}{dx^2} + \frac{d^2w}{dy^2} + \frac{d^2w}{dz^2} = 0$$

It therefore follows that the vertical gradient of the earths magnetic field can be determined by the sum of the horizontal gradients in two mutually orthogonal directions.

An embodiment of the invention for detecting vertical magnetic gradient may therefore be formed of four co-planar coils. The coils are connected in two pairs, each pair determining the horizontal gradient in a respective orthogonal direction. The two pairs are connected such that their outputs are summed. Sweeping the detector horizontally will thus generate a signal indicative of the vertical magnetic gradient. Using appropriate output circuits, this embodiment can, of course, be used to give simply the horizontal gradients in the two horizontal directions.

As discussed above, an important practical problem of detection of such objects as mines, is the elimination of "false alarms". That is to say, it is important to establish the difference between signals generated due to the presence of a mine, and those generated due to the presence of other objects or discontinuities under the surface of the ground. The previous embodiments referred to above deal with certain possibilities for at least reducing the risk of false alarms. It will be understood that by introducing the possibility of measuring vertical magnetic field gradients, in addition to horizontal magnetic field gradients, the discrimination between true and false signals can be improved.

Applying this principle to the first embodiment of the invention, it can be seen that characteristic output signals corresponding to both horizontal and vertical magnetic field gradients can be derived from a scan with a detector over a sample object.

The characteristic output signals can then be recorded, coded and stored in the memory of a computer for subsequent use as a reference when searching for objects in a certain area. Such characteristic output signals can be obtained by way of a preliminary test performed on a sample object in an environment similar to that in which it is likely to be detected.

Once output signals indicative of the horizontal or vertical gradients, or both, indicate the presence of a buried object, the vertical gradients, as indicated by either the first of each of the two pairs of coils, or the second of each of the two pairs of coils can be compared with readings obtained from a preliminary test carried out on a sample mine in the same or a corresponding area. At this point, it may be found that the most favourable arrangement would be to have only one pair of coils capable of detecting vertical gradients, connected to an output circuit, and by raising and lowering the detector, the characteristic of the vertical gradient can be obtained.

In a preferred embodiment, the distance between the two common planes can be varied.

It will be well understood that different types of mine and different environments in which they are located can give rise to characteristic signals which make it possible to differentiate the effects arising from a mine from those arising from other objects or discontinuities.

Figure 6:
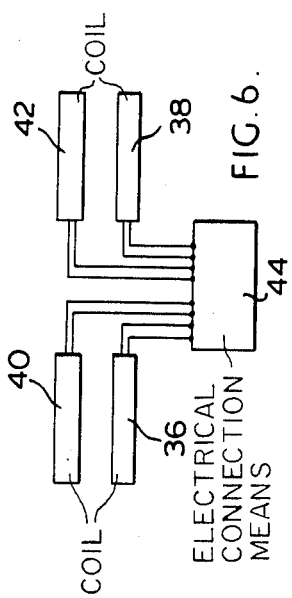
FIG. 6 is a diagrametic representation of an alternative to the arrangement of FIG. 4(a).

FIG. 6 shows a first pair of coils 36 and 38 lying in a first common plane, and a second pair of coils 40 and 42 lying in a second common plane parallel to the first common plane. The first and second common planes are horizontal. The coil 40 is vertically aligned above the coil 36, and the coil 42 is vertically aligned above the coil 38. Each of the coils 36, 38, 40 and 42 is connected to electrical connection means 44, which is capable of connecting various combinations of the coils 36, 38, 40 and 42 in opposition to an output circuit.

When coils 36 and 38 only are connected in opposition, or when the coils 40 and 42 only are connected in opposition, the detector can only detect changes in the horizontal gradient of a magnetic field. Similarly, the when the coils 36 and 40 only are connected in opposition, or when the coils 38 and 42 only are connected in opposition, the detector can only detect changes in the vertical gradient of a magnetic field. However, when both a horizontal pair of coils (such as 36 and 38) are connected together in oppostion and a vertically aligned pair of coils (such as 40 and 42) are connected together in opposition the detector can detect changes in both vertical and horizontal gradients of a magnetic field.

The four coils 36, 38, 40 and 42 are all mounted on a rigid frame (not shown) which is adjustable so that the distance between the two common planes can be changed.

What I claim is:

1. A method of detecting the presence of a localized disturbance of the ground comprising the steps of sweeping an area of the ground with a detector which is responsive to a magnetic gradient and which comprises a plurality of mutually spaced apart detector units, detecting a change in the output from the detector units due to a change in magnetic gradient caused by the localized disturbance and not by any magnetic object and producing a signal capable of direct human perception when such change is detected.

2. A method as claimed in claim 1, including the step of providing the detector with two detector units which are co-planar and horizontally spaced apart.

3. A method as claimed in claim 1, including the step of balancing the output from the detector units prior to sweeping the area of ground by sweeping the detector in an area containing a homogenus magnetic field.

4. A method as claimed in claim 1, further comprising the step of making repeated sweeps in different directions over the area of ground so as to establish the outline of the disturbance.

5. A method as claimed in claim 4, including the step of placing a mark or marker on the ground at the position which causes the change in output from the detector units.

6. A method as claimed in claim 1, including the step of providing four detector units arranged in two pairs the units of each pair being co-planar and horizontally spaced apart from each other and in which each member of each pair is co-axially aligned with a respective member from the other pair.

7. A method as claimed in claim 1, including the step of providing four detector units arranged co-planar, horizontally spaced apart and interconnected in two pairs, respective lines joining the centres of the coils of each pair being mutually perpendicular.

8. A method as claimed in claim 1, further comprising the step of distinguishing between disturbances caused, at least in part, by magnetically susceptible or non-magnetically susceptible buried objects by detecting the sign of the magnetic gradient causing the change in the output from the detector units.

9. A method as claimed in claim 4, comprising the steps of conducting a preliminary test using a sample object, storing the characteristic signal resulting from the test and, during operation, rejecting signals which do not match the stored signal.

10. A method for detecting a physical disturbance of the ground defined by a boundary between disturbed ground and undisturbed ground, the method comprising the steps of sweeping an area of the ground with a detector which is responsive to a magnetic gradient, generating a signal indicative of the magnetic gradient at the boundary between the disturbed and undisturbed ground, and producing an output capable of direct human perception in response to the signal.

* * * * *